US008804979B2

(12) United States Patent
Elmedyb et al.

(10) Patent No.: US 8,804,979 B2
(45) Date of Patent: Aug. 12, 2014

(54) METHOD OF DETERMINING PARAMETERS IN AN ADAPTIVE AUDIO PROCESSING ALGORITHM AND AN AUDIO PROCESSING SYSTEM

(75) Inventors: Thomas Bo Elmedyb, Smørum (DK); Jesper Jensen, Smørum (DK); Meng Guo, Smørum (DK)

(73) Assignee: Oticon A/S, Smorum (DK)

( * ) Notice: Subject to any disclaimer, the term of this patent is extended or adjusted under 35 U.S.C. 154(b) by 334 days.

(21) Appl. No.: 13/267,624

(22) Filed: Oct. 6, 2011

(65) Prior Publication Data

US 2012/0087509 A1 Apr. 12, 2012

Related U.S. Application Data

(60) Provisional application No. 61/390,202, filed on Oct. 6, 2010.

(30) Foreign Application Priority Data

Oct. 6, 2010 (EP) .................................... 10186693

(51) Int. Cl.
*H04B 15/00* (2006.01)

(52) U.S. Cl.
USPC ............ 381/93; 381/66; 381/83; 379/406.06; 379/406.07; 379/406.08; 379/406.09; 379/406.12; 379/406.13

(58) Field of Classification Search
CPC ........... H04R 27/00; H04B 3/20; H04B 15/00
USPC .............. 381/83, 93, 66; 379/406.05–406.12, 379/406.06–406.09, 406.12–406.13
See application file for complete search history.

(56) References Cited

U.S. PATENT DOCUMENTS 5,473,701 A 12/1995 Cezanne et al.
5,680,467 A 10/1997 Hansen (Continued)

FOREIGN PATENT DOCUMENTS

EP 1 191 813 A1 3/2002
EP 1 469 702 A2 10/2004

(Continued)

OTHER PUBLICATIONS

Burton et al., "A New Structure for Combining Echo Channel Cancellation and Beamforming in Changing Acoustical Enviroments", IEEE, ICASSP 2007, pp. 1-77 to 1-80, 2007.

(Continued)

*Primary Examiner* — Disler Paul
(74) *Attorney, Agent, or Firm* — Birch, Stewart, Kolasch & Birch, LLP

(57) ABSTRACT

A method and an audio processing system determine a system parameter, e.g. step size, in an adaptive algorithm, e.g. an adaptive feedback cancellation algorithm so as to provide an alternative scheme for feedback estimation in a multi-microphone audio processing system. A feedback part of the system's open loop transfer function is estimated and separated in a transient part and a steady state part, which can be used to control the adaptation rate of the adaptive feedback cancellation algorithm by adjusting the system parameter, e.g. step size parameter, of the algorithm when desired system properties, such as a steady state value or a convergence rate of the feedback, are given/desired. The method can be used for different adaptation algorithms such as LMS, NLMS, RLS, etc. in hearing aids, headsets, handsfree telephone systems, teleconferencing systems, public address systems, etc.

19 Claims, 6 Drawing Sheets

(56) References Cited

U.S. PATENT DOCUMENTS

| | | | | |
|---|---|---|---|---|
| 5,768,398 | A * | 6/1998 | Janse et al. | 381/103 |
| 6,876,751 | B1 | 4/2005 | Gao et al. | |
| 7,764,799 | B2 * | 7/2010 | Roovers et al. | 381/66 |
| 7,899,195 | B2 * | 3/2011 | Okumura et al. | 381/83 |
| 8,385,557 | B2 * | 2/2013 | Tashev et al. | 381/66 |
| 2005/0163331 | A1 | 7/2005 | Gao et al. | |
| 2007/0172080 | A1 | 7/2007 | Janse et al. | |
| 2008/0095389 | A1 | 4/2008 | Theverapperuma | |

FOREIGN PATENT DOCUMENTS

| | | | |
|---|---|---|---|
| EP | 2 003 928 | A1 | 12/2008 |
| EP | 2 088 802 | A1 | 8/2009 |
| EP | 2 217 007 | A1 | 8/2010 |
| WO | WO 99/09786 | A1 | 2/1999 |
| WO | WO 03/010995 | A2 | 2/2003 |
| WO | WO 2007/125132 | A2 | 11/2007 |

OTHER PUBLICATIONS

Dillon, “Hearing Aids”, Thieme Medical Pub., Chapter 4.6, pp. 107-111, 2001.

Elko, “Superdirectional Microphone Arrays”, Acoustic Signal Processing for Telecommunication (Gay et al., editors), First edition, Chapter 10, pp. 181-237, 2000.

Gunnarsson et al., “Frequency Domain Tracking Characteristics of Adaptive Algorithms”, IEEE Transactions on Acoustics, Speech, and Signal Processing, vol. 37, No. 7, pp. 1072-1089, Jul. 1989.

Haykin, “Adaptive Filter Theory”, 4th Edition, Chapters 5, 6 and 9, pp. 231-319, 320-343 and 436-465, 2001.

Proakis et al., “Digital Signal Processing: Principles, Algorithms, and Applications”, Third Edition, Chapter 5, pp. 403-407, 1996.

* cited by examiner

METHOD OF DETERMINING PARAMETERS IN AN ADAPTIVE AUDIO PROCESSING ALGORITHM AND AN AUDIO PROCESSING SYSTEM

Cross Reference to Related Applications:

This nonprovisional application claims the benefit under 35 U.S.C. §119(e) of U.S. Provisional Application No. 61/390,202 filed on Oct. 6, 2010 and under 35 U.S.C. §119(a) to Patent Application No. 10186693.7 filed in Europe, on Oct. 6, 2010. The entire contents of all of the above applications are hereby incorporated by reference.

TECHNICAL FIELD

The present invention relates to the area of audio processing, e.g. acoustic feedback cancellation in audio processing systems exhibiting acoustic or mechanical feedback from a loudspeaker to a microphone, as e.g. experienced in public address systems or listening devices, e.g. hearing aids.

In an aspect, a prediction of the stability margin in audio processing systems in real-time is provided. In a further aspect, the control of parameters of an adaptive feedback cancellation algorithm to obtain desired properties is provided.

The present concepts are in general useable for determining parameters of an adaptive algorithm, e.g. parameters relating to its adaptation rate. The present disclosure specifically relates to a method of determining a system parameter of an adaptive algorithm, e.g. step size in an adaptive feedback cancellation algorithm or one or more filter coefficients of an adaptive beamformer filter algorithm, and to an audio processing system. Other parameters of an adaptive algorithm may likewise be determined using the concepts of the present disclosure. Other algorithms than for cancelling feedback may likewise benefit from elements of the present disclosure, e.g. an adaptive directional algorithm.

The application further relates to a data processing system comprising a processor and program code means for causing the processor to perform at least some of the steps of the method and to a computer readable medium storing the program code means.

The disclosure may e.g. be useful in applications such as hearing aids, headsets, handsfree telephone systems, teleconferencing systems, public address systems, etc.

BACKGROUND ART

The following account of the prior art relates to one of the areas of application of the present application, hearing aids.

Acoustic feedback occurs because the output loudspeaker signal from an audio system providing amplification of a signal picked up by a microphone is partly returned to the microphone via an acoustic coupling through the air or other media. The part of the loudspeaker signal returned to the microphone is then re-amplified by the system before it is re-presented at the loudspeaker, and again returned to the microphone. As this cycle continues, the effect of acoustic feedback becomes audible as artifacts or even worse, howling, when the system becomes unstable. The problem appears typically when the microphone and the loudspeaker are placed closely together, as e.g. in hearing aids. Some other classic situations with feedback problem are telephony, public address systems, headsets, audio conference systems, etc.

The stability in systems with a feedback loop can be determined, according to the Nyquist criterion, by the open loop transfer function (OLTF). The system becomes unstable when the magnitude of OLTF is above 1 (0 dB) and the phase is a multiple of 360° ($2\pi$).

The widely used and probably best solution to date for reducing the effect of this feedback problem consists of identifying the acoustic feedback coupling by means of an adaptive filter [Haykin]). Traditionally, design and evaluation criteria such as mean-squared error, squared error deviation and variants of these are widely used in the design of adaptive systems. However, none of these are directly related to what developers really need in the design of acoustic feedback cancellation systems in a hearing aid.

The OLTF is a far more direct and crucial criterion for the stability of hearing aids and the capability of providing appropriate gains (cf. e.g. [Dillon] chapter 4.6). In a hearing aid setup, the OLTF consists of a well-defined forward signal path and an unknown feedback path (see e.g. FIG. 1*d*). E.g. when the magnitude of the feedback part of the OLTF is −20 dB, the maximum gain provided by the forward path of the hearing aid must not exceed 20 dB; otherwise, the system becomes unstable. On the other hand, if the magnitude of the OLTF is approaching 0 dB, then we know that the hearing aid is getting unstable at the frequencies, when the phase response is a multiple of 360°, and some actions are needed to minimize the risk of oscillations and/or an increased amount of artifacts.

Furthermore, knowing the expected magnitude value of the unknown feedback part of the OLTF might be very helpful for hearing aid control algorithms in order to choose the proper parameters, program modes etc. to control for instance the adaptive feedback cancellation algorithm. The general problem of estimating the power spectrum of a time varying transfer function for a linear, time varying system using an adaptive algorithm has been dealt with by [Gunnarsson & Ljung]. Approximate expressions for the frequency domain mean square error (MSE) between the true, momentary, transfer function and an estimated transfer function are developed in [Gunnarsson & Ljung] for three basic adaptation algorithms LMS (least mean squares), RLS (recursive least squares) and a tracking algorithm based on the Kalman filter.

DISCLOSURE OF INVENTION

The elements contributing to the unknown feedback part (including beam form filters) of the open loop transfer function of an exemplary audio processing system are shown in FIG. 1*d*.

An object of the present application is to provide an alternative scheme for feedback estimation in a multi-microphone audio processing system.

The loudspeaker signal is denoted by $u(n)$, where n is the time index. The microphone and the incoming (target) signals are denoted by $y_i(n)$ and $x_i(n)$, respectively. The subscript $i = 1, \ldots, P$ is the index of the microphone channel, where P denotes the total number of microphone channels. The impulse responses of the feedback paths between the only loudspeaker and each microphone are denoted by $h_i(n)$, whereas the estimated impulse responses of these by means of adaptive algorithms such as LMS, NLMS, RLS, etc. are denoted by $\hat{h}_i(n)$. The corresponding signals are denoted $v_i(n)$ and $\hat{v}_i(n)$, respectively.

The impulse responses of the beamformer filters are denoted by $g_i$. The beamformer filters are assumed to be time invariant (or at least to have slower variations than the feedback cancellation systems). The error signals $e_i(n)$ are generated as a subtraction of the feedback estimate signals $\hat{v}_i(n)$, from the respective microphone signals $y_i(n)$, i=1, . . . , P in respective sum-units '+'.

The error signals $e_i(n)$ are fed to corresponding beamformer filters, whose respective outputs are denoted by $\bar{e}_i(n)$, i=1, . . . , P. Finally, the output signals from the beamformer filters $\bar{e}_i(n)$ are added in sum-unit '+', whose resulting output is denoted by $\bar{e}_i(n)$.

Preferably, the number P of microphones is larger than two, e.g. three or more.

The boxes H, $H_{est}$, Beamformer and Microphone System (MS) enclose components that together are referred to as such elsewhere in the application, cf. e.g. FIG. 1*c*.

The term 'beamformer' refers in general to a spatial filtering of an input signal, the 'beamformer' providing a frequency dependent filtering depending on the spatial direction of origin of an acoustic source (directional filtering). In a portable listening device application, e.g. a hearing aid, it is often advantageous to attenuate signals or signal components having their spatial origin in a direction to the rear of the person wearing the listening device.

The inclusion of the contribution of the beamformer in the estimate of the feedback path is important because of its angle dependent attenuation (i.e. because of its weighting of the contributions of each individual microphone input signal to the resulting signal being further processed in the device in question). Taking into account the presence of the beamformer results in a relatively simple expression that is directly related to the OLTF and the allowable forward gain.

In the present application, an estimated value of a parameter or function x is generally indicated by a '^' above the parameter or function, i.e. as $\hat{x}$. Alternatively, a subscript 'est' is used, e.g. $x_{est}$, as used e.g. in FIG. 1*c* ($H_{est}$ for the estimated feedback path) or in $h_{est,i}$ for the estimated impulse response of the $i^{th}$ unintended (acoustic) feedback path.

The system shown in FIG. 1*d* is a typical feedback part of the OLTF in a hearing aid setup, whereas the forward path (not shown in FIG. 1*d*, cf. e.g. FIG. 1*c*) usually takes the signal $\bar{e}_i(n)$ as input and has the signal u(n) as output.

The signal processing of the system of FIG. 1*d* is illustrated to be performed in the time domain. This need not be the case, however. It can be fully or partially performed in the frequency domain (as also implied in FIGS. 1*a* and 1*b*). The beamformer filters $g_i$ in FIG. 1*d*, for example, each represent an impulse response in the time domain, so the input signal $e_i(n)$ to a given filter $g_i$ is linearly convolved with the impulse response $g_i$ to form the output signal $\bar{e}_i(n)$. Alternatively, in the frequency domain, the input signal in each microphone branch is transformed to the frequency domain, e.g. via an analysis filter bank (e.g. an FFT (fast Fourier transform) filter bank), and the frequency transform $G_i(\omega)$ of the beamformer impulse response $g_i$ would be multiplied with the frequency transform of the input signal, to form the processed signal $\bar{E}_i(\omega)$, which is the frequency transform of the time-domain output signal of the beamformer ($\bar{e}_i(n)$. In the frequency domain, the forward gain would be implemented by multiplying a scalar gain F(ω,n) onto each frequency element of the beamformer output. At some point, the signal is transformed back to the time domain, e.g. via a synthesis filter bank (e.g. an inverse FFT filter bank), so that a time-domain signal u(n) can be played back through the loudspeaker. Such exemplary configuration is illustrated in FIG. 1*e*. Alternatively, the analysis and synthesis filter banks may be located in connection with the input and output transducers, respectively, whereby the processing of the forward path (and the feedback estimation paths) is fully performed in the frequency domain (as e.g. implied in FIGS. 1*a* and 1*b*).

The OLTF is easily obtained if the true feedback paths $h_i(n)$ are known. However, this is not the case in real applications. In the following, we focus on and derive expressions for the magnitude square value of the unknown feedback part of the OLTF shown in FIG. 1*d*. We express the magnitude square value of the feedback part of the OLTF as an approximation of input signal spectral density, loudspeaker signal spectral densities, beamformer filter responses, step size of the adaptive algorithm, and the variations in the true feedback paths. The advantage of this approach is that we can determine the OLTF without knowing the true feedback path $h_i(n)$. All required system parameters to determine the OLTF are already known or can simply be estimated.

In addition to predicting the feedback part of OLTF given all system parameters, the derived expression can also be used to control the adaptation of the feedback estimate by adjusting one or more adaptation parameters when desired system properties, such as steady state value of feedback part of the OLTF or the convergence rate of the OLTF, are given.

The expressions of the OLTF can be derived using different adaptation algorithms such as LMS, NLMS, RLS, etc.

Objects of the application are achieved by the invention described in the accompanying claims and as described in the following.

A Method of Determining a System Parameter:

An object of the application is achieved by a method of determining a system parameter sp of an adaptive algorithm, e.g. step size μ in an adaptive feedback cancellation algorithm or one or more filter coefficients of an adaptive beamformer filter algorithm, in an audio processing system, the audio processing system comprising a) a microphone system comprising a1) a number P of electric microphone paths, each microphone path MPi, i=1, 2, . . . , P, providing a processed microphone signal, each microphone path comprising a1.1) a microphone $M_i$ for converting an input sound to an input microphone signal $y_i$;

a1.2) a summation unit $SUM_i$ for receiving a feedback compensation signal $\hat{v}_i$ and the input microphone signal or a signal derived therefrom and providing a compensated signal $e_i$; and a1.3) a beamformer filter $g_i$ for making frequency-dependent directional filtering of the compensated signal $e_i$, the output of said beamformer filter $g_i$ providing a processed microphone signal $\bar{e}_i$, i=1, 2, . . . , P;

a2) a summation unit SUM(MP) connected to the output of the microphone paths i=1, 2, . . . , P, to perform a sum of said processed microphone signals $\bar{e}_i$, i=1, 2, . . . , P, thereby providing a resulting input signal;

b) a signal processing unit for processing said resulting input signal or a signal originating therefrom to a processed signal;

c) a loudspeaker unit for converting said processed signal or a signal originating therefrom, said input signal to the loudspeaker being termed the loudspeaker signal u, to an output sound;

said microphone system, signal processing unit and said loudspeaker unit forming part of a forward signal path; and d) an adaptive feedback cancellation system comprising a number of internal feedback paths $IFBP_i$, i=1, 2, . . . , P, for generating an estimate of a number P of unintended feedback paths, each unintended feedback path at least comprising an external feedback path from the output of the loudspeaker unit to the input of a microphone $M_i$, i=1, 2, . . . , P, and each internal feedback path comprising a feedback estimation unit for providing an estimated impulse response $h_{est,i}$ of the $i^{th}$ unintended feedback path, i=1, 2, . . . , P, using said adaptive feedback cancellation algorithm, the estimated impulse response $h_{est,i}$ constituting said feedback compensation signal $\hat{v}_i$ being subtracted from said microphone signal $y_i$ or a signal derived therefrom in respective summation units $SUM_i$ of said microphone system to provide error signals $e_i$, i=1, 2, . . . , P;

the forward signal path, together with the external and internal feedback paths defining a gain loop;

the method comprising

S1) determining an expression of an approximation of the square of the magnitude of the feedback part of the open loop transfer function, $\hat{\pi}(\omega,n)$, where ω is normalized angular frequency, and n is a discrete time index, where the feedback part of the open loop transfer function comprises the internal and external feedback paths, and the forward signal path, exclusive of the signal processing unit, and wherein the approximation defines a first order difference equation in $\hat{\pi}(\omega,n)$, from which a transient part depending on previous values in time of $\hat{\pi}(\omega,n)$ and a steady state part can be extracted, the transient part as well as the steady state part being dependent on the system parameter sp(n), e.g. step size μ(n), at the current time instance n;

S2a) determining the slope per time unit α for the transient part,

S3a) expressing the system parameter sp(n), e.g. step size μ(n), by the slope α;

S4a) determining the system parameter sp(n), e.g. step size μ(n), for a predefined slope-value $\alpha_{pd}$;

or

S2b) determining the steady state value $\hat{\pi}(\omega,\infty)$ of the steady state part, S3b) expressing the system parameter sp(n), e.g. step size μ(n), by the steady state value $\hat{\pi}(\omega,\infty)$;

S4b) determining the system parameter sp(n), e.g. step size μ(n), for a predefined steady state value $\hat{\pi}(\omega,\infty)_{pd}$.

The method has the advantage of providing a relatively simple way of identifying dynamic changes in the acoustic feedback path(s).

In an embodiment, the expression of an approximation of the square of the magnitude of the feedback part of the open loop transfer function $\pi_{est}(\omega,n)$ is determined in the following steps:

S1a) The estimation error vector $h_{diff,i}(n)=h_{est,i}(n)-h_i(n)$ is computed as the difference between the i'th estimated and true feedback path (i=1, 2, . . . , P corresponding to each of the P microphone paths, at time instance n);

S1b) The estimation error correlation matrix $H_{ij}(n)=E[h_{diff,i}(n)\, h^T_{diff,j}(n)]$ is computed;

S1c) An approximation $H_{est,ij}(n)$ is made from $H_{ij}(n)$ by ignoring the higher order terms appearing in $H_{ij}(n)$ due to presence of their lower order terms;

S1d) The diagonal entries of $F \cdot H_{est,ij}(n) \cdot F^T$ are computed, where F denotes the discrete Fourier matrix;

S1e) $\hat{\pi}(\omega,n)$ is finally determined as a linear combination of the diagonal entries of $F \cdot H_{est,ij}(n) \cdot F^T$ and the frequency responses $G_i(\omega)$ and $G_j(\omega)$ of the beamformer filters $g_i$ and $g_j$.

In step S1a), the estimation error vector $h_{diff,i}(n)$ will depend on the type of adaptation algorithm (LMS, NLMS, RLS, etc.). For an LMS algorithm, the adaptive filter estimates are updated using the following update rule $$h_{est,i}(n)=h_{est,i}(n-1)+\mu_i(n)e_i(n)x_i(n),$$

where $e_i$ and $x_i$ are the $i^{th}$ error signal and incoming (target) signal, respectively (sf. FIG. 1*d*), an $\mu_i$ is the step size of the adaptive algorithm (eihter identical at all frequencies or band specific). Other update rules exist for other adaptive algorithms, cf. e.g. [Haykin].

In a preferred embodiment of step S1c), only the lowest order term appearing in a particular $H_{ij}(n)$ is used. In other words, if e.g. the expression for $H_{ij}(n)$ comprises a parameter x of lowest order 1 and the parameter in higher orders, e.g. $x^2$, $x^3$, etc., then the higher order terms $x^2$, $x^3$, etc. are neglected. If the lowest order of the parameter x is 2 ($x^2$), then the higher order terms $x^3$, etc. are neglected.

The matrix elements of a discrete Fourier matrix are defined as $e^{(-j2\pi kn/N)}$, where N is the order of the discrete Fourier transform (DFT), k, n=0, 1, . . . , N−1, and j is the complex (or imaginary) unit ($j^2=-1$), see e.g. [Proakis].

The expressions of the OLTF can be derived using different adaptation algorithms such as LMS, NLMS, RLS, etc., or is based on Kalman filtering. In the following, the expressions and examples are given based on the LMS algorithm. Thereafter corresponding formulas are given for the NLMS- and RLS-algorithms.

In an embodiment, the summation unit $SUM_i$ of the $i^{th}$ microphone path is located between the microphone $M_i$ and the beamformer filter $g_i$. In an embodiment, the microphone path consists of a microphone, a summation unit and a beamformer filter electrically connected in that order.

In an embodiment, the system parameter sp(n) comprises a step size μ(n) of an adaptive algorithm. In an embodiment, the parameter sp(n) comprises a step size μ(n) of an adaptive feedback cancellation algorithm. In an embodiment, the system parameter sp(n) comprises one or more filter coefficients in the beamformer filter $g_i$ of an adaptive beamformer filter algorithm, e.g. by firstly determining the desired frequency response of the beamformer filter $g_i$ and then calculate the filter coefficient using e.g. inverse Fourier Transform.

In an embodiment, the steady state value $\hat{\pi}(\omega,\infty)$ of the expression of the square of the magnitude of the feedback part of the open loop transfer function, $\hat{\pi}(\omega,n)$ for $n\rightarrow\infty$ is assumed to be reached after less than 500 ms, such as less than 100 ms, such as less than 50 ms.

In an embodiment, a predetermined desired value of the steady state part $\hat{\pi}(\omega,\infty)_{pd}$ of the feedback part of the open loop transfer function $\hat{\pi}(\omega,n)$ at a given angular frequency ω is used in step S4b) to determine a corresponding value of the system parameter sp(n) (e.g. the step size μ) of the adaptive algorithm at a given point in time and at the given angular frequency ω.

In an embodiment, a predetermined desired value $\alpha_{pd}$ of the slope per time unit for the transient part of the feedback part of the open loop transfer function $\hat{\pi}(\omega,n)$ at a given angular frequency ω is used in step S4a) to determine a corresponding value of a system parameter sp(n) (e.g. the step size μ) of the adaptive algorithm at a given point in time and at the given angular frequency ω.

In an embodiment, an angular frequency ω at which the system parameter sp(n) is determined in step S4) is chosen as a frequency where the steady state value of the feedback part of the open loop transfer function $\hat{\pi}(\omega,n)$ is maximum or larger than a predefined value.

In an embodiment, an angular frequency ω at which the system parameter sp(n) is determined in step S4) is chosen as a frequency where instantaneous value of the feedback part of the open loop transfer function $\hat{\pi}(\omega,n)$ is maximum or expected to be maximum or larger than a predefined value.

In an embodiment, an angular frequency ω at which the system parameter sp(n) is determined in step S4) is chosen as a frequency where the gain G(n) of the signal processing unit is highest, or where the gain G(n) of the signal processing unit has experienced the largest recent increase, e.g. within the last 50 ms.

In the following, the step size μ of an adaptive algorithm is taken as an example of the use of the method. Alternatively, other parameters of an adaptive algorithm could be determined, e.g. adaptation rate.

LMS-Algorithm

The LMS (Least Mean Squares) algorithm is e.g. described in [Haykin], Chp. 5, page 231-319.

It can be shown that the magnitude square of the feedback part of the OLTF $\hat{\pi}(\omega,n)$ can be approximated by $$\hat{\pi}(\omega,n) \approx (1-2\mu(n)S_u(\omega))\hat{\pi}(\omega,n-1) + L\mu^2(n)S_u(\omega)\sum_{i=1}^{P}\sum_{j=1}^{P}G_i(\omega)G_j^*(\omega)\bar{S}_{x_{ij}}(\omega) + \sum_{i=1}^{P}|G_i|^2 S_{\check{h}ii}(\omega), \quad (1)$$

where '*' denotes complex conjugate, n and ω are the time index and normalized frequency, respectively, μ(n) denotes the step size, and where $S_u(\omega)$ denotes the power spectral density of the loudspeaker signal u(n), $S_{Xij}(\omega)$ denotes the cross power spectral densities for incoming signal $x_i(n)$ and $x_j(n)$, where i=1, 2, . . . , P are the indices of the microphone channels, where P is the number of microphones, L is the length of the estimated impulse response $h_{est,i}(n)$, and $G_l(\omega)$ where l=i,j is the squared magnitude response of the beamformer filters $g_l$, and where $S_{\check{h}ii}(\omega)$ is an estimate of the variance of the true feedback path h(n) over time.

The 'normalized frequency' ω is intended to have its normal meaning in the art, i.e. the angular frequency, normalized to values from 0 to 2π. The normalized frequency is typically normalized to a sampling frequency $f_s$ for the application in question, so that the normalized frequency can be expressed as $\omega=2\pi(f/f_s)$, so that ω varies between 0 and 2π, when the frequency f varies between 0 and the sampling frequency $f_s$.

The accuracy of the approximation expressed by equation (1) (and correspondingly for the equations concerning the NLMS and RLS algorithms outlined further below) depends on a number of parameters or conditions, including one or more of the following:

- The acoustic signals applied to the audio processing system are quasi-stationary, which means signals that are non-stationary but can be modelled as being stationary within local time frames.
- The acoustic signals picked up by the microphones of the audio processing system are uncorrelated with the signals played by the loudspeaker, which in practice means that the forward delay in hearing aids is large enough, so that the incoming signal x(n) and the loudspeaker signal u(n) become uncorrelated. In other applications like headset, this is almost always the case.
- The step size μ is relatively small (μ->0) (or alternatively for an RLS algorithm, the forgetting factor λ is close to 1 (λ->1 (from below)). Appropriate values of μ are e.g. $2^{-4}$, or $2^{-9}$, e.g. between but not limited to $2^{-1}$ and $2^{-12}$ or smaller than $2^{-12}$.
- The order L of the adaptive filters of the adaptive feedback cancellation system is relatively large (L->∞). Appropriate values of L are e.g. ≥32, or ≥64, e.g. between 16 and 128 or larger than or equal to 128.

From Eq. (1) it is seen that the transient property of the $\hat{\pi}(\omega,n)$ can be described as a $1^{st}$ order IIR (Infinite Impulse Response) process $$\frac{\beta}{1-\alpha z^{-1}}, \quad (2)$$

where $$\alpha=1-2\mu(n)S_u(\omega) \quad (3)$$

determines the slope of the decay of $\hat{\pi}(\omega,n)$.

The slope in dB per iteration is expressed by $$\mathrm{Slope}_{dB/iteration}\approx 10\log_{10}(\alpha)=10\log_{10}(1-2\mu(n)S_u(\omega)), \quad (4)$$

and the slope in dB per second is expressed by $$\mathrm{Slope}_{dB/s}\approx 10\log_{10}(\alpha)f_s=10\log_{10}(1-2\mu(n)S_u(\omega))f_s, \quad (5)$$

where $f_s$ is the sampling rate.

When a specific slope (or convergence rate) is desired, it is seen from Eq. (4) and (5) that the step size can be chosen according to $$\mu(n)\approx\frac{1-10^{\mathrm{Slope}_{dB/iteration}/10}}{2S_u(\omega)}, \quad (6)$$

and $$\mu(n)\approx\frac{1-10^{\mathrm{Slope}_{dB/s}/(10f_s)}}{2S_u(\omega)}. \quad (7)$$

Furthermore, from Eq. (1) the steady state value of $\hat{\pi}(\omega,\infty)=\lim_{n\to\infty}\hat{\pi}(\omega,n)$ can be calculated as $$\hat{\pi}(\omega,\infty)\approx\lim_{n\to\infty}L\frac{\mu(n)}{2}\sum_{i=1}^{P}\sum_{j=1}^{P}G_i(\omega)G_j^*(\omega)S_{x_{ij}}(\omega)+\lim_{n\to\infty}\frac{\sum_{i=1}^{P}|G_i(\omega)|^2S_{\check{h}ii}(\omega)}{2\mu(n)S_u(\omega)}. \quad (8)$$

In order to reach a desired steady state value $\hat{\pi}(\omega,\infty)$, the step size should be adjusted according to Eq. (8) as $$\mu(n)\approx\frac{\hat{\pi}(\omega,\infty)\pm\sqrt{\hat{\pi}^2(\omega,\infty)-L\sum_{i=1}^{P}\sum_{j=1}^{P}G_i(\omega)G_j^*(\omega)S_{x_{ij}}(\omega)\sum_{i=1}^{P}|G_i(\omega)|^2S_{\check{h}ii}(w)\Big/S_u(\omega)}}{L\sum_{i=1}^{P}\sum_{j=1}^{P}G_i(\omega)G_j^*S_{x_{ij}}(\omega)}. \quad (9)$$

By ignoring the variation in the feedback path, the Eq. (9) can be simplified into $$\mu(n)\approx\frac{2\hat{\pi}(\omega,\infty)}{L\sum_{i=1}^{P}\sum_{j=1}^{P}G_i(\omega)G_j^*(\omega)S_{x_{ij}}(\omega)}. \quad (10)$$

It implies that whenever the system parameters L, $G_l(\omega)$ (l=i,j) and $S_{xij}(\omega)$ change, the step size μ(n) should be adjusted in order to keep a constant steady state value $\hat{\pi}(\omega,\infty)$.

The corresponding equations (cf. Eq. (1), (3), (6), (8) and (10) above) for NLMS and RLS algorithms are given in the following:

NLMS-algorithm:

The NLMS (Normalized Least Mean Squares) algorithm is e.g. described in [Haykin], Chp 6, page 320-343.

$$\hat{\pi}(\omega, n) = \left(1 - 2\frac{\mu(n)}{L\sigma_u^2}S_u(\omega)\right)\hat{\pi}(\omega, n-1) + L\left(\frac{\mu(n)}{L\sigma_u^2}\right)^2 S_u(\omega)\sum_{i=1}^{P}\sum_{j=1}^{P} G_i(\omega)G_j^*(\omega)S_{x_{ij}}(\omega) + \sum_{i=1}^{P}|G_i(\omega)|^2 S_{\dot{h}ii}(\omega), \quad (1)_{NLMS}$$

$$\alpha = 1 - 2\frac{\mu(n)}{L\sigma_u^2}S_u(\omega), \quad (3)_{NLMS}$$

and $$\hat{\pi}(\omega, \infty) = \lim_{n\to\infty}\frac{\mu(n)}{2\sigma_u^2}\sum_{i=1}^{P}\sum_{j=1}^{P} G_i(\omega)G_j^*(\omega)S_{x_{ij}}(\omega) + \lim_{n\to\infty} L\sigma_u^2\frac{\sum_{i=1}^{P}|G_i(\omega)|^2 S_{\dot{h}ii}(\omega)}{2\mu(n)S_u(\omega)}, \quad (8)_{NLMS}$$

where $\sigma_u^{\,2}$ is the signal variance of loudspeaker signal u(n).

The step size μ(n) can be adjusted in order to obtain, respectively, desired convergence rate and steady-state values according to $$\mu(n) = L\sigma_u^2\frac{1 - 10^{CR[dB/iteration]/10}}{2S_u(\omega)}, \quad (6)_{NLMS}$$

and $$\mu(n) = \frac{2\sigma_u^2\hat{\pi}(\omega, \infty)}{\sum_{i=1}^{P}\sum_{j=1}^{P} G_i(\omega)G_j^*(\omega)S_{x_{ij}}(\omega)}. \quad (10)_{NLMS}$$

RLS-algorithm:

The RLS (Recursive Least Squares) algorithm is e.g. described in [Haykin], Chp. 9, page 436-465.

$$\hat{\pi}(\omega, n) = (1 - 2p(\omega, n)S_u(\omega))\hat{\pi}(\omega, n-1) + Lp^2(\omega, n)S_u(\omega)\sum_{i=1}^{P}\sum_{j=1}^{P} G_i(\omega)G_j^*(\omega)S_{x_{ij}}(\omega) + \sum_{i=1}^{P}|G_i(\omega)|^2 S_{\dot{h}ii}(\omega), \quad (1)_{RLS}$$

where $$p(\omega, n) = \frac{1}{\lambda}(p(\omega, n-1) - p^2(\omega, n-1)S_u(\omega)).$$

λ(n) is the forgetting factor in RLS algorithm and p(ω,n) is calculated as the diagonal elements in the matrix $$\lim_{L\to\infty} FP(n)F^H,$$

where $F \in \square^{L\times L}$ denotes the DFT matrix (cf. e.g. [Proakis], Chp. 5 page 403-404), and P(n) is calculated as $$P(n) = \left(\sum_{i=1}^{n}\lambda^{n-i}u(i)u^T(i) + \delta\lambda^n I\right)^{-1},$$

where δ is a constant and I is the identity matrix. Other transformations than DFT (Discrete Fourier Transformation) can be used, e.g. IDFT (inverse DFT), when appropriately expressed as a matrix multiplication, where F is the transformation matrix.

Furthermore, $$\alpha = \mathbf{2}\lambda - \mathbf{1}, \quad (3)_{RLS}$$

and $$\hat{\pi}(\omega, \infty) = L\frac{1-\lambda}{2S_u(\omega)}\sum_{i=1}^{P}\sum_{j=1}^{P} G_i(\omega)G_j^*(\omega)S_{x_{ij}}(\omega) + \frac{\sum_{i=1}^{P}|G_i(\omega)|^2 S_{\check{h}_{ii}}(\omega)}{2(1-\lambda)}. \quad (8)_{RLS}$$

The forgetting factor λ can be adjusted in order to obtain, respectively, desired convergence rate and steady-state values according to $$\lambda = \frac{1 + 10^{CR[dB/iteration]/10}}{2}, \quad (6)_{RLS}$$

and $$\lambda = 1 - \frac{2S_u(\omega)\hat{\pi}(\omega, \infty)}{L\sum_{i=1}^{P}\sum_{j=1}^{P} G_i(\omega)G_j^*(\omega)S_{x_{ij}}(\omega)}. \quad (10)_{RLS}$$

In an embodiment, the power spectral density $S_u(\omega)$ of the loudspeaker signal u(n) is continuously calculated. In an embodiment, the cross power spectral densities $S_{xij}(\omega)$ for incoming signal $x_i(n)$ and $x_j(n)$ are continuously estimated from the respective error signals $e_i(n)$ and $e_j(n)$. In the present context, the term 'continuously calculated/estimated' is taken to mean calculated or estimated for every value of a time index (for each n, where n is a time index, e.g. a frame index or just a sample index). In an embodiment, n is a frame index, a unit index length corresponding to a time frame with certain length and hop-factor.

In an embodiment, the variance $S_{hii}(\omega)$ of the true feedback path h(n) over time is estimated and stored in the audio processing system in an offline procedure prior to execution of the adaptive feedback cancellation algorithm.

In an embodiment, the frequency response $G_i(\omega)$ of the beamformer filter $g_i$, i=1, . . . , P is continuously calculated, in case it is assumed that $g_i$ changes substantially over time, or alternatively in an off-line procedure, e.g. a customization procedure, prior to execution of the adaptive feedback cancellation algorithm.

An Audio Processing System:

In a further aspect, an audio processing system is provided. The audio processing system comprises a) a microphone system comprising a1) a number P of electric microphone paths, each microphone path MPi, i=1, 2, . . . , P, providing a processed microphone signal, each microphone path comprising a1.1) a microphone $M_i$ for converting an input sound to an input microphone signal $y_i$;

a1.2) a summation unit $SUM_i$ for receiving a feedback compensation signal $\hat{v}_i$ and the input microphone signal or a signal derived therefrom and providing a compensated signal $e_i$; and a1.3) a beamformer filter $g_i$ for making frequency-dependent directional filtering of the compensated signal $e_i$, the output of said beamformer filter $g_i$ providing a modified microphone signal $\bar{e}_i$, i=1, 2, . . . , P;

a2) a summation unit SUM(MP) connected to the output of the microphone paths i=1, 2, . . . , P, to perform a sum of said processed microphone signals $yp_i$, i=1, 2, . . . , P, thereby providing a resulting input signal;

b) a signal processing unit for processing said resulting input signal or a signal originating therefrom to a processed signal;

c) a loudspeaker unit for converting said processed signal or a signal originating therefrom, said input signal to the loudspeaker being termed the loudspeaker signal u, to an output sound;

said microphone system, signal processing unit and said loudspeaker unit forming part of a forward signal path; and d) an adaptive feedback cancellation system comprising a number of internal feedback paths $IFBP_i$, i=1, 2, . . . , P, for generating an estimate of a number P of unintended feedback paths, each unintended feedback path at least comprising an external feedback path from the output of the loudspeaker unit to the input of a microphone $M_i$, i=1, 2, . . . , P, and each internal feedback path comprising a feedback estimation unit for providing an estimated impulse response $h_{est,i}$ of the $i^{th}$ unintended feedback path, i=1, 2, . . . , P, using said adaptive feedback cancellation algorithm, the estimated impulse response $h_{est,i}$ constituting said feedback compensation signal $\hat{v}_i$ being subtracted from said microphone signal $y_i$ or a signal derived therefrom in respective summation units $SUM_i$ of said microphone system to provide error signals $e_i$, i=1, 2, . . . , P;

the forward signal path, together with the external and internal feedback paths defining a gain loop;

wherein the signal processing unit is adapted to determine an expression of an approximation of the square of the magnitude of the feedback part of the open loop transfer function, $\pi_{est}(\omega,n)$, where ω is normalized angular frequency and n is a discrete time index, and wherein the approximation defines a first order difference equation in $\pi_{est}(\omega,n)$, from which a transient part depending on previous values in time of $\pi_{est}(\omega,n)$ and a steady state part can be extracted, the transient part as well as the steady state part being dependent on a system parameter sp(n) of an adaptive algorithm, e.g. the step size μ(n) of an adaptive feedback cancellation algorithm, at the current time instance n; and wherein the signal processing unit based on said transient and steady state parts is adapted to determine the system parameter sp(n), e.g. the step size μ(n), from a predefined slope-value $\alpha_{pd}$ or from a predefined steady state value $\pi_{est}(\omega,\infty)_{pd}$ respectively.

In an embodiment, the system parameter sp(n) comprises a step size μ(n) of an adaptive algorithm. In an embodiment, the parameter sp(n) comprises a step size μ(n) of an adaptive feedback cancellation algorithm. In an embodiment, the system parameter sp comprises one or more filter coefficients of an adaptive beamformer filter algorithm.

It is intended that the process features of the method described above, in the detailed description of 'mode(s) for carrying out the invention' and in the claims can be combined with the system, when appropriately substituted by a corresponding structural feature and vice versa. Embodiments of the system have the same advantages as the corresponding method.

In an embodiment, the audio processing system comprises a forward or signal path between the microphone system (and/or a direct electric input, e.g. a wireless receiver) and the loudspeaker. In an embodiment, the signal processing unit is located in the forward path. In an embodiment, the audio processing system comprises an analysis path comprising functional components for analyzing the input signal (e.g. determining a level, a modulation, a type of signal, an acoustic feedback estimate, etc.). In an embodiment, some or all signal processing of the analysis path and/or the signal path is conducted in the frequency domain. In an embodiment, some or all signal processing of the analysis path and/or the signal path is conducted in the time domain.

In an embodiment, an analogue electric signal representing an acoustic signal is converted to a digital audio signal in an analogue-to-digital (AD) conversion process, where the analogue signal is sampled with a predefined sampling frequency or rate $f_s$, $f_s$ being e.g. in the range from 8 kHz to 40 kHz (adapted to the particular needs of the application) to provide digital samples $x_s$ (or x[n]) at discrete points in time $t_n$ (or n), each audio sample representing the value of the acoustic signal at $t_n$ by a predefined number $N_s$ of bits, $N_s$ being e.g. in the range from 1 to 16 bits. A digital sample x has a length in time of $1/f_s$, e.g. 50 μs, for $f_s$=20 kHz. In an embodiment, a number of audi samples are arranged in a time frame. In an embodiment, a time frame comprises 64 audio data samples. Other frame lengths may be used depending on the practical application.

In an embodiment, the audio processing systems comprise an analogue-to-digital (AD) converter to digitize an analogue input with a predefined sampling rate, e.g. 20 kHz. In an embodiment, the audio processing system comprise a digital-to-analogue (DA) converter to convert a digital signal to an analogue output signal, e.g. for being presented to a user via an output transducer.

In an embodiment, the audio processing system, e.g. the microphone unit (and or an optional transceiver unit) comprises a TF-conversion unit for providing a time-frequency representation of an input signal. In an embodiment, the time-frequency representation comprises an array or map of corresponding complex or real values of the signal in question in a particular time and frequency range. In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit for converting a time variant input signal to a (time variant) signal in the frequency domain. In an embodiment, the frequency range considered by the audio processing system from a minimum frequency $f_{min}$ to a maximum frequency $f_{max}$ comprises a part of the typical human audible frequency range from 20 Hz to 20 kHz, e.g. a part of the range from 20 Hz to 12 kHz. In an embodiment, the frequency range $f_{min}$-$f_{max}$ considered by the audio processing system is split into a number M of frequency bands, where M is e.g. larger than 5, such as larger than 10, such as larger than 50, such as larger than 100, such as larger than 250, such as larger than 500, at least some of which are processed individually. In an embodiment, the audio processing system is/are adapted to process their input signals in a number of different frequency channels. The frequency channels may be uniform or non-uniform in width (e.g. increasing in width with increasing frequency), overlapping or non-overlapping.

In an embodiment, the audio processing system further comprises other relevant functionality for the application in question, e.g. compression, noise reduction, etc.

In an embodiment, the audio processing system comprises a hearing aid, e.g. a hearing instrument, e.g. a hearing instrument adapted for being located at the ear or fully or partially in the ear canal of a user, e.g. a headset, an earphone, an ear protection device or a combination thereof. In an embodiment, the audio processing system comprises a handsfree telephone system, a mobile telephone, a teleconferencing system, a security system, a public address system, a karaoke system, a classroom amplification systems or a combination thereof.

Use of an Audio Processing System:

In a further aspect, use of an audio processing system as described above, in the detailed description of ‘mode(s) for carrying out the invention’ and in the claims is furthermore provided. In an embodiment, use of the audio processing system according in a hearing aid, a headset, a handsfree telephone system or a teleconferencing system, or a car-telephone system or a public address system is provided.

A Computer Readable Medium:

A tangible computer-readable medium storing a computer program comprising program code means for causing a data processing system to perform at least some (such as a majority or all) of the steps of the method described above, in the detailed description of ‘mode(s) for carrying out the invention’ and in the claims, when said computer program is executed on the data processing system is furthermore provided by the present application. In addition to being stored on a tangible medium such as diskettes, CD-ROM-, DVD-, or hard disk media, or any other machine readable medium, the computer program can also be transmitted via a transmission medium such as a wired or wireless link or a network, e.g. the Internet, and loaded into a data processing system for being executed at a location different from that of the tangible medium.

A Data Processing System

A data processing system comprising a processor and program code means for causing the processor to perform at least some (such as a majority or all) of the steps of the method described above, in the detailed description of ‘mode(s) for carrying out the invention’ and in the claims is furthermore provided by the present application.

Further objects of the application are achieved by the embodiments defined in the dependent claims and in the detailed description of the invention.

As used herein, the singular forms “a,” “an,” and “the” are intended to include the plural forms as well (i.e. to have the meaning “at least one”), unless expressly stated otherwise. It will be further understood that the terms “includes,” “comprises,” “including,” and/or “comprising,” when used in this specification, specify the presence of stated features, integers, steps, operations, elements, and/or components, but do not preclude the presence or addition of one or more other features, integers, steps, operations, elements, components, and/or groups thereof. it will be understood that when an element is referred to as being “connected” or “coupled” to another element, it can be directly connected or coupled to the other element or intervening elements maybe present, unless expressly stated otherwise. Furthermore, “connected” or “coupled” as used herein may include wirelessly connected or coupled. As used herein, the term “and/or” includes any and all combinations of one or more of the associated listed items. The steps of any method disclosed herein do not have to be performed in the exact order disclosed, unless expressly stated otherwise.

BRIEF DESCRIPTION OF DRAWINGS

The disclosure will be explained more fully below in connection with a preferred embodiment and with reference to the drawings in which.

The figures are schematic and simplified for clarity, and they just show details which are essential to the understanding of the disclosure, while other details are left out. Throughout, the same reference numerals are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

MODE(S) FOR CARRYING OUT THE INVENTION

FIG. 1 shows various models of audio processing systems according to embodiments of the present disclosure.

Figure 1A:
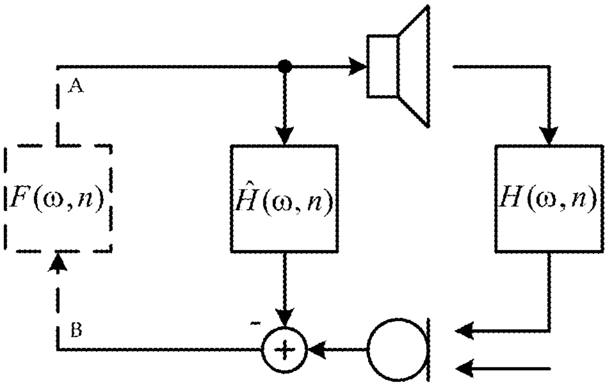
FIG. 1 shows various models of audio processing systems according to embodiments of the present disclosure.

FIG. 1*a* shows a model of an audio processing system according to the present disclosure in its simplest form. The audio processing system comprises a microphone and a speaker. The transfer function of feedback from the speaker to the microphone is denoted by $H(\omega,n)$. The target (or additional) acoustic signal input to the microphone is indicated by the lower arrow. The audio processing system further comprises an adaptive algorithm $\hat{H}(\omega,n)$ for estimating the feedback transfer function $H(\omega,n)$. The feedback estimate unit $\hat{H}(\omega,n)$ is connected between the speaker and a sum-unit (‘+’) for subtracting the feedback estimate from the input microphone signal. The resulting feedback-corrected (error) signal is fed to a signal processing unit $F(\omega,n)$ for further processing the signal (e.g. applying a frequency dependent gain according to a user’s needs), whose output is connected to the speaker and feedback estimate unit $\hat{H}(\omega,n)$. The signal processing unit $F(\omega,n)$ and its input (A) and output (B) are indicated by a dashed (out)line to indicate the elements of the system which are in focus in the present application, namely the elements, which together represent the feedback part of the open loop transfer function of the audio processing system (i.e. the parts indicated with a solid (out)line. The system of FIG. 1*a* can be viewed as a model of a one speaker—one microphone audio processing system, e.g. a hearing instrument.

Figure 1B:
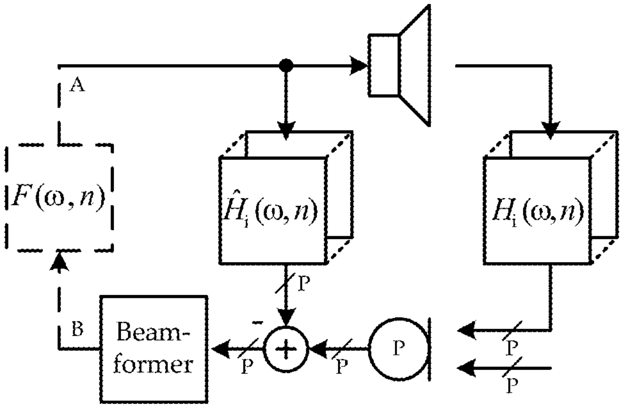

FIG. 1*b* shows a model of an audio processing system according to the present disclosure as shown in FIG. 1*a*, but instead of one microphone and one acoustic feedback path and one feedback estimation path, a multitude P of microphones (e.g. two or more microphones), acoustic feedback paths $H_i(\omega,n)$ and feedback estimation paths $\hat{H}_i(\omega,n)$ are indicated. Additionally, the embodiment of FIG. 1*b* includes a Beamformer block receiving the P feedback corrected inputs from the P SUM-units ('+') and supplying a frequency-dependent, directionally filtered (and feedback corrected) input signal to the signal processing unit F(ω,n) for further processing the signal and providing a processed output signal which is fed to the loudspeaker and to the feedback estimation paths $\hat{H}_i(\omega,n)$.

Figure 1E:
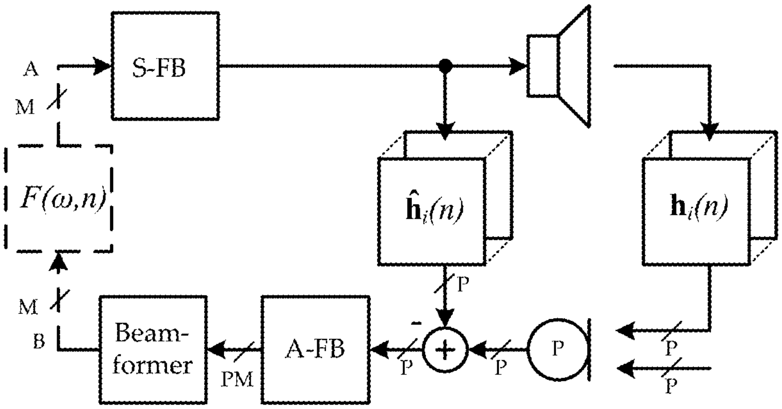
Figure 1C:
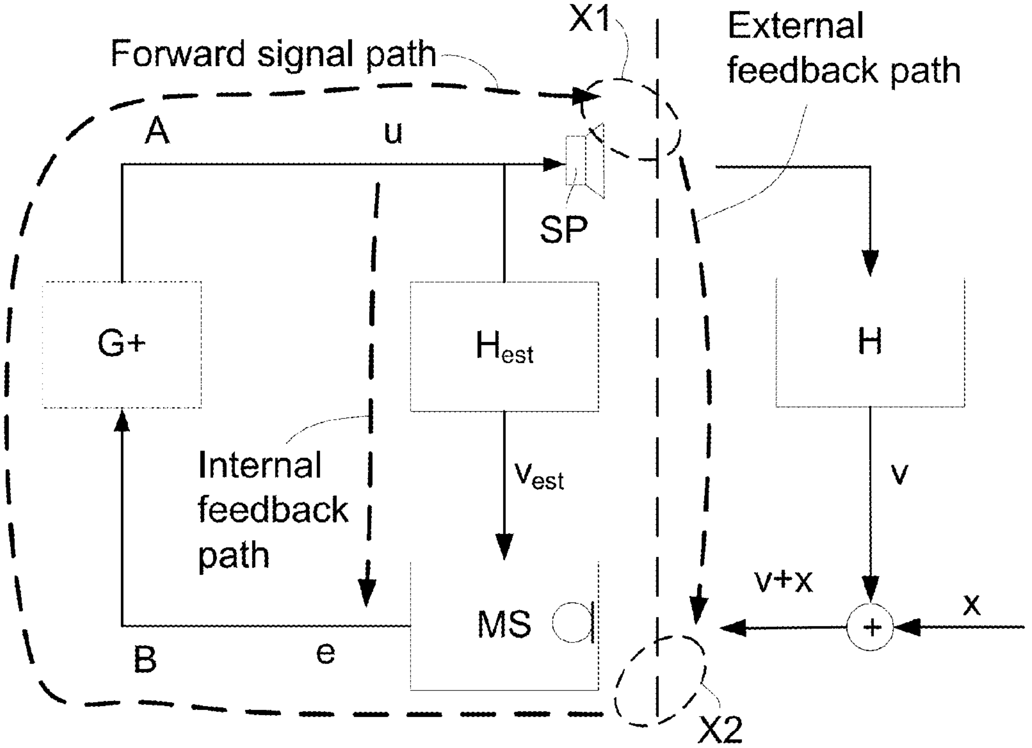

FIG. 1c shows a generalized view of an audio processing system according to the present disclosure, which e.g. may represent a public address system or a listening system, here thought of as a hearing aid system.

Figure 1D:
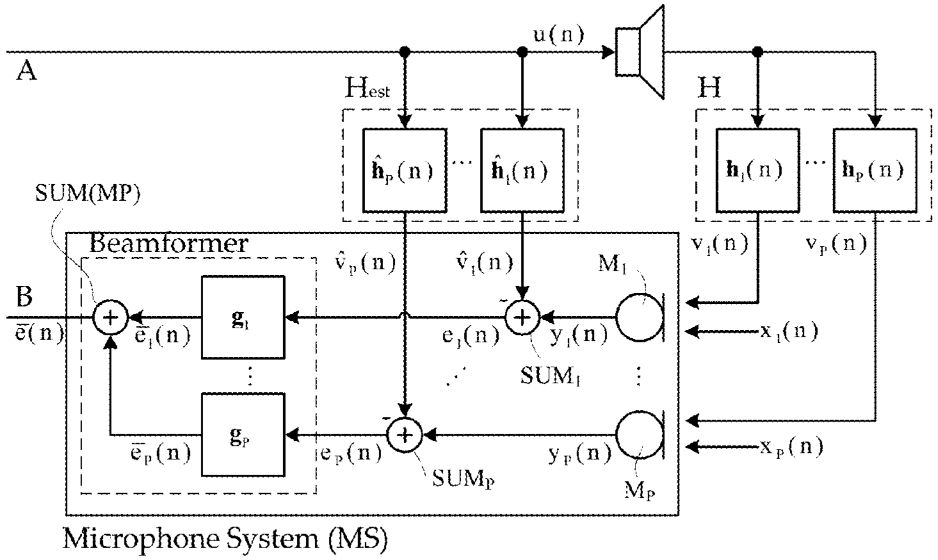
Figure 2A:
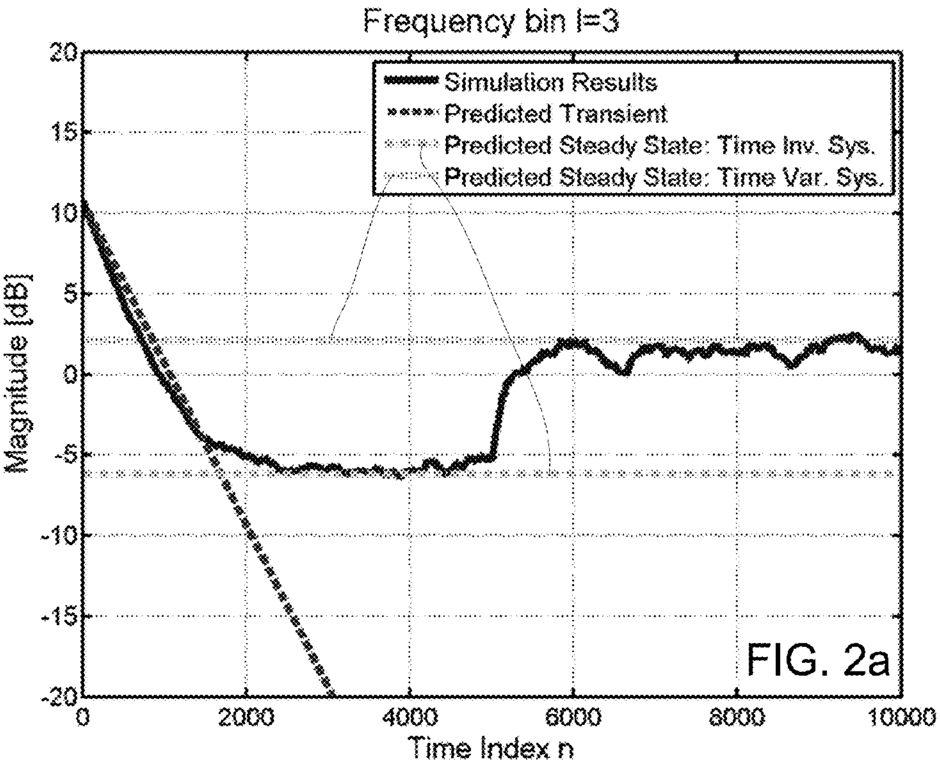
FIG. 2 shows simulation of magnitude values of the OLTF at four different frequencies in a 3 microphone system.
Figure 2B:
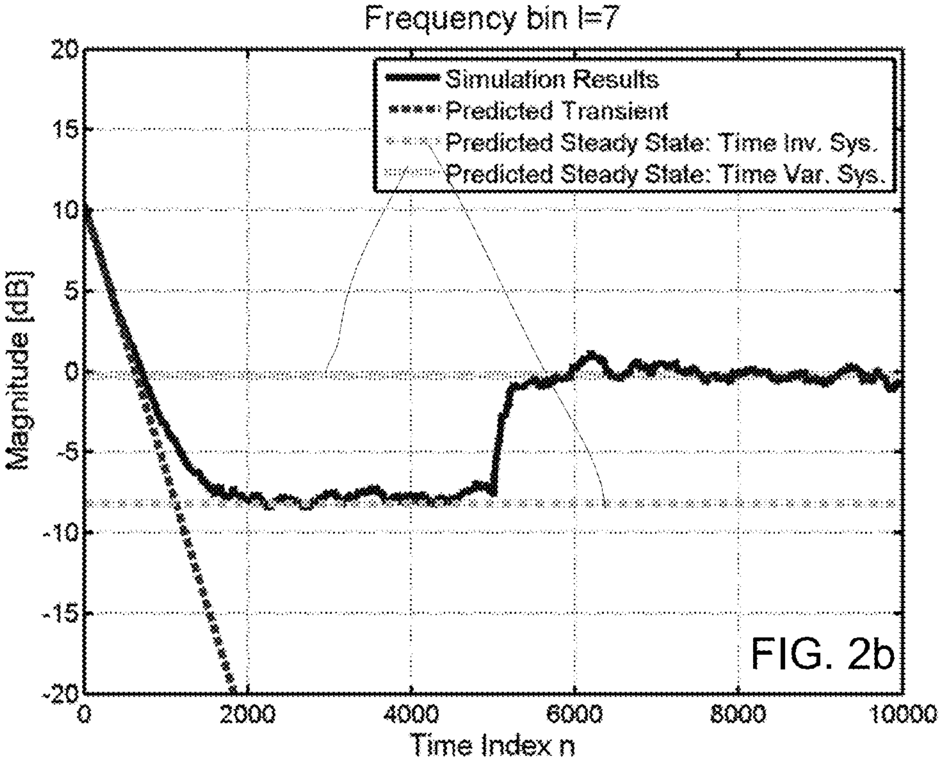
Figure 2C:
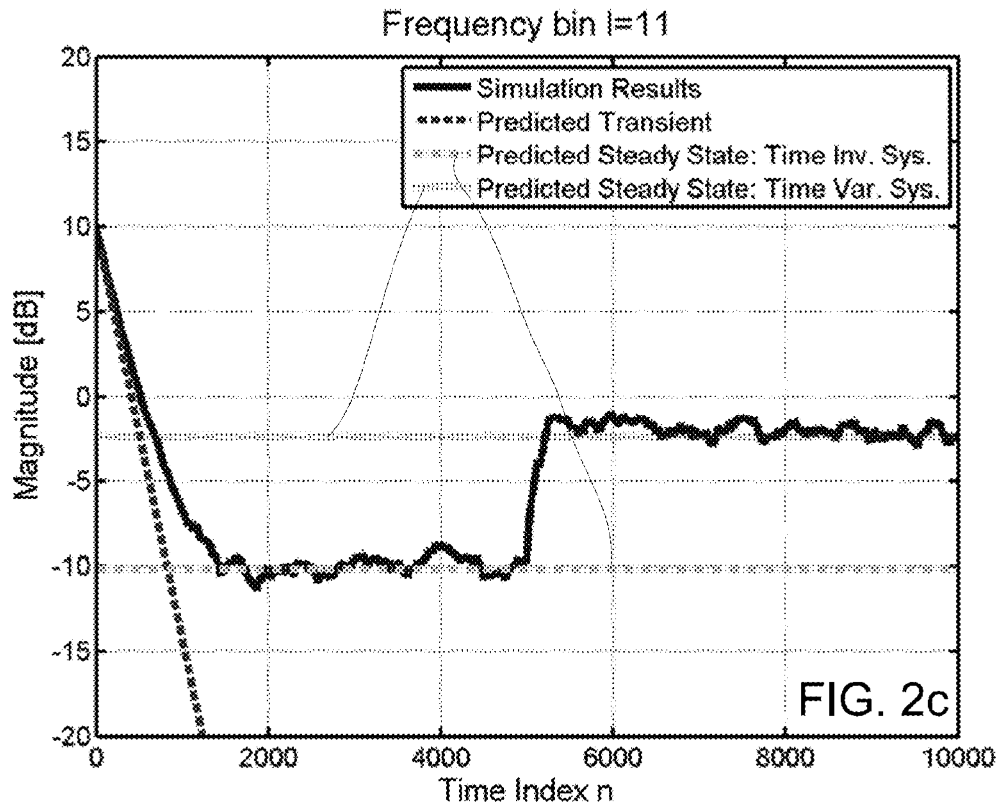
Figure 2D:
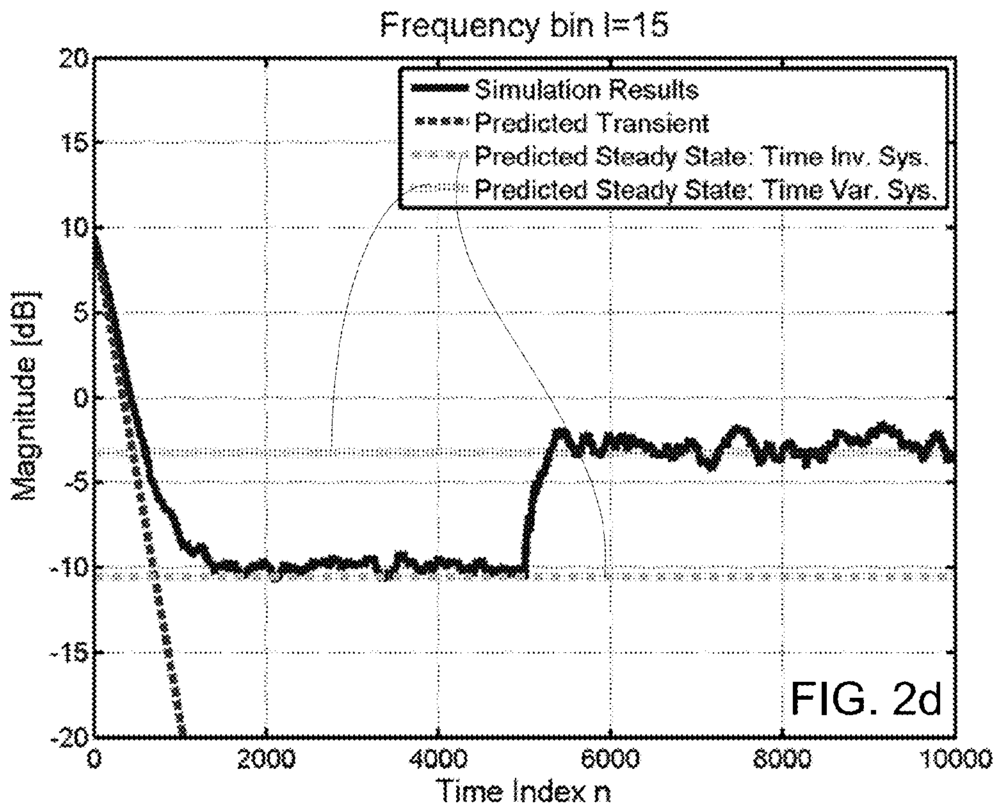

The hearing aid system comprises an input transducer system (MS) adapted for converting an input sound signal to an electric input signal (possibly enhanced, e.g. comprising directional information), an output transducer (SP) for converting an electric output signal to an output sound signal and a signal processing unit (G+), electrically connecting the input transducer system (MS) and the output transducer (SP), and adapted for processing an input signal (e) and provide a processed output signal (u). An (unintended, external) acoustic feedback path (H) from the output transducer to the input transducer system is indicated to the right of the vertical dashed line. The hearing aid system further comprises an adaptive feedback estimation system ($H_{est}$) for estimating the acoustic feedback path and electrically connecting to the output transducer (SP) and the input transducer system (MS). The adaptive feedback estimation system ($H_{est}$) comprises an adaptive feedback cancellation algorithm. The input sound signal comprises the sum (v+x) of an unintended acoustic feedback signal v and a target signal x. In the embodiment of FIG. 1c, the electric output signal u from the signal processing unit G+ is fed to the output transducer SP and is used as an input signal to the adaptive feedback estimation system $H_{est}$ as well. The time and frequency dependent output signal(s) $v_{est}$ from the adaptive feedback estimation system $H_{est}$ is intended to track the unintended acoustic feedback signal v. Preferably, the feedback estimate $v_{est}$ is subtracted from the input signal (comprising target and feedback signals x+v), e.g. in summation unit(s) in the forward path of the system (e.g. in block MS as shown in FIG. 1d), thereby ideally leaving the target signal x to be further processed in the signal processing unit (G+).

The input transducer system may e.g. be a microphone system (MS) comprising one or more microphones. The microphone system may e.g. also comprises a number of beamformer filters (e.g. one connected to each microphone) to provide directional microphone signals that may be combined to provide an enhanced microphone signal, which is fed to the signal processing unit for further signal processing (cf. e.g. FIG. 1d).

A forward signal path between the input transducer system (MS) and the output transducer (SP) is defined by the signal processing unit (G+) and electric connections (and possible further components) there between (cf. dashed arrow Forward signal path). An internal feedback path is defined by the feedback estimation system ($H_{est}$) electrically connecting to the output transducer and the input transducer system (cf. dashed arrow Internal feedback path). An external feedback path is defined from the output of the output transducer (SP) to the input of the input transducer system (MS), possibly comprising several different sub-paths from the output transducer (SP) to individual input transducers of the input transducer system (MS) (cf. dashed arrow External feedback path). The forward signal path, the external and internal feedback paths together define a gain loop. The dashed elliptic items denoted X1 and X2 respectively and tying the external feedback path and the forward signal path together is intended to indicate that the actual interface between the two may be different in different applications. One or more components or parts of components in the audio processing system may be included in either of the two paths depending on the practical implementation, e.g. input/output transducers, possible A/D or D/A-converters, time->frequency or frequency->time converters, etc.

The adaptive feedback estimation system comprises e.g. an adaptive filter. Adaptive filters in general are e.g. described in [Haykin]. The adaptive feedback estimation system is e.g. used to provide an improved estimate of a target input signal by subtracting the estimate from the input signal comprising target as well as feedback signal. The feedback estimate may be based on the addition of probe signals of known characteristics to the output signal. Adaptive feedback cancellation systems are well known in the art and e.g. described in U.S. Pat. No. 5,680,467 (GN Danavox), in US 2007/172080 A1 (Philips), and in WO 2007/125132 A2 (Phonak).

The adaptive feedback cancellation algorithm used in the adaptive filter may be of any appropriate type, e.g. LMS, NLMS, RLS or be based on Kalman filtering. Such algorithms are e.g. described in [Haykin].

The directional microphone system is e.g. adapted to separate two or more acoustic sources in the local environment of the user wearing the listening device. In an embodiment, the directional system is adapted to detect (such as adaptively detect) from which direction a particular part of the microphone signal originates. The terms 'beamformer' and 'directional microphone system' are used interchangeably. Such systems can be implemented in various different ways as e.g. described in U.S. Pat. No. 5,473,701 or in WO 99/09786 A1 or in EP 2 088 802 A1. An exemplary textbook describing multi-microphone systems is [Gay & Benesty], chapter 10, *Superdirectional Microphone Arrays*. An example of the spatial directional properties (beamformer pattern) of a directional microphone system is shown in FIG. 5.

Figure 5A:
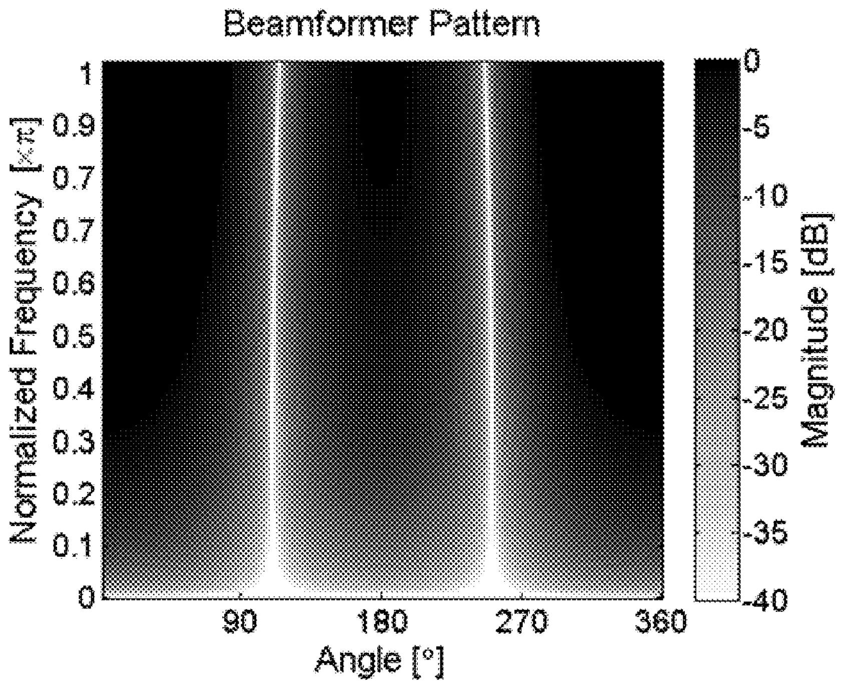
FIG. 5 shows an example of a beamformer characteristic.
Figure 5B:
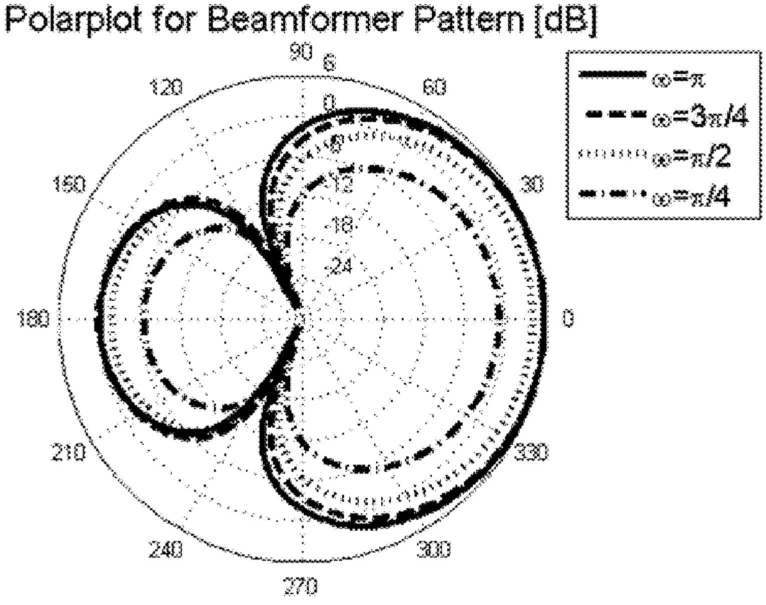

In FIG. 5a, the x (horizontal) and y (vertical) axes give the incoming angle (the front direction is 0 degrees) and normalized frequency ω (left vertical axis) of the sound signals, respectively. The shading at a specific (x,y)-point indicates the amplification of the beamformer in dB (cf. legend box to the right of the graph, in general the darker shading the less attenuation). Hence, the example shown in FIG. 5 is for a beamformer, which suppresses the sound signals coming from about +/−115 degrees with 35-40 dB for almost all frequencies. FIG. 5b shows a polar plot of the attenuation of an equivalent beamformer at different angles, where selected iso-normalized frequency curves are shown (corresponding to $\omega=\pi$, $3\pi/4$, $\pi/2$ and $\pi/4$)

The signal processing unit (G+) is e.g. adapted to provide a frequency dependent gain according to a user's particular needs. It may be adapted to perform other processing tasks e.g. aiming at enhancing the signal presented to the user, e.g. compression, noise reduction, etc., including the generation of a probe signal intended for improving the feedback estimate.

FIG. 1d represents a more detailed view of the embodiment of FIG. 1b as regards the beamformer elements illustrating a one speaker audio processing system comprising a multitude P of microphones (e.g. two or more), which together represent the feedback part of the open loop transfer function of the system.

The audio processing system of FIG. 1d is similar to the ones shown in FIG. 1b and reads on the general model of FIG. 1c. The audio processing system of FIG. 1d comprises a microphone system (MS in FIG. 1c) comprising a number P of electric microphone paths, each microphone path MPi, $i=1, 2, \ldots, P$, providing a processed microphone signal $\bar{e}_i$. Preferably, P is larger than or equal to two, e.g. three. Each microphone path comprises 1) a microphone $M_i$ for converting an input sound to an input microphone signal $y_i$; 2) a summation unit $SUM_i$ ('+') for subtracting a compensation signal $\hat{v}_i$ from the adaptive feedback estimation system ($H_{est}$ in FIG. 1*c*) from an input microphone signal $y_i$ and providing a compensated signal $e_i$ (error signal), and 3) a beamformer filter $g_i$ for making frequency-dependent directional filtering. The output of the beamformer filter $g_i$ provides a processed microphone signal $\bar{e}_i$, $i=1, 2, \ldots, P$, based on the respective error signal $e_i$.

The microphone system further comprises a summation unit SUM(MP) ('+') connected to the output of the microphone paths $i=1, 2, \ldots, P$, to perform a sum of the processed microphone signals $\bar{e}_i$, $i=1, 2, \ldots, P$, thereby providing a resulting input signal by $\bar{e}$.

In the system of FIG. 1*d* the adaptive feedback estimation system ($H_{est}$ of FIG. 1*c*) comprises a number of internal feedback paths $IFBP_i$, $i=1, 2, \ldots, P$, for generating an estimate of a number P of unintended feedback paths, each unintended feedback path at least comprising an external feedback path from the output of the loudspeaker unit to the input of a microphone $M_i$, $i=1, 2, \ldots, P$, and each internal feedback path comprising a feedback estimation unit for providing an estimated impulse response $\hat{h}_i$ of the $i^{th}$ unintended feedback path, $i=1, 2, \ldots, P$, using an adaptive feedback cancellation algorithm. The estimated impulse response $\hat{h}_i$ represented by signal $\hat{v}_i$ is subtracted from the microphone signal $y_i$ (as shown in FIG. 1*d*) or a from signal derived therefrom in respective summation units $SUM_i$ ('+') (here shown to form part of the microphone system (MS) to provide error signals $e_i$, $i=1, 2, \ldots, P$. Together, the adaptive feedback estimation system and the summation units $SUM_i$ ('+') form part of a feedback cancellation system of the audio processing system.

The signal processing unit (G+ in FIG. 1*c* or F(ω,n) in FIG. 1*a*, 1*b*) is adapted to determine an expression of an approximation of the square of the magnitude of the feedback part of the open loop transfer function, $\pi_{est}(\omega,n)$, where ω is normalized angular frequency and n is a discrete time index, and wherein the approximation defines a first order difference equation in $\pi_{est}(\omega,n)$, from which a transient part depending on previous values in time of $\pi_{est}(\omega,n)$ and a steady state part can be extracted, the transient part as well as the steady state part being dependent on the step size μ(n) at the current time instance n; and wherein the signal processing unit based on said transient and steady state parts is adapted to determine the step size μ(n) from a predefined slope-value $\alpha_{pd}$ or from a predefined steady state value $\pi_{est}(\omega,\infty)_{pd}$, respectively.

FIG. 1*e* shows an audio processing system as in FIG. 1*b*, but wherein the processing of the Beamformer and the signal processing unit (F(ω,n)) is performed in the frequency domain. An analysis filterbank (A-FB) is inserted in each of the microphone paths, $i=1, 2, \ldots, P$, whereby the error corrected input signals are converted to the time-frequency domain, each signal being represented by time dependent values in M frequency bands. A synthesis filterbank (S-FB) is inserted in the forward path after the signal processing unit (F(ω,n)) to provide the output signal to the loudspeaker in the time domain. Other parts of the processing of the audio processing system may be performed fully or partially in the frequency domain, e.g. the feedback estimation (e.g. the adaptive algorithms of blocks $\hat{H}_i$).

Other components (or functions) may be present than the ones shown in FIG. 1. The forward signal path may e.g. comprise analogue to digital (A/D) and digital to analogue (D/A) converters, time to time-frequency and time-frequency to time converters, which may or may not be integrated with, respectively, the input and output transducers. Similarly, the order of the components may be different to the one shown in FIG. 1. In an embodiment, the subtraction units ('+') and the beamformer filters $g_i$ of the microphone paths are reversed compared to the embodiment shown in FIG. 1*d*.

EXAMPLES

In this section, three examples illustrating a possible use of aspects of the present invention are given (based on the LMS algorithm):

1. Prediction of the transient and steady state of $\hat{\pi}(\omega,n)$.
2. Step size control to achieve a certain convergence rate at the transient part.
3. Step size control to achieve a certain steady state value $\hat{\pi}(\omega,\infty)$ In the first example, equation (1) above is be used to predict $\hat{\pi}(\omega,n)$, when all system parameters are given. The predicted values can be used to determine the maximum allowable gain in the forward path to ensure the system stability.

If, e.g., the predicted value of $\hat{\pi}(\omega,n)$ is −30 dB, then we know from the stability criterion that the gain in the hearing aid must be limited to 30 dB.

An example of prediction of transient and steady state in a 3 microphone system is shown. The radian frequencies to be evaluated are $$\omega = \frac{2\pi l}{L},$$

where l=3, 7, 11, 15 denote the frequency bin numbers. Here, L representing the length of the adaptive filter, the filter order being L−1, is equal to 32, and step size $\mu=2^{-9}$.

In FIG. 2, the simulation results are given. FIG. 2 shows simulation of magnitude values of the OLTF at four different frequencies in a 3 microphone system. The predicted transient process (inclined dashed lines) and the steady state values without (horizontal (lower) dashed-dotted lines) and with (horizontal (upper) dotted lines) feedback path variations expressed using Eq. (1) are successfully verified by the simulated magnitude values (solid curves). The results are averaged using 100 simulation runs. It is seen that the simulation results confirmed the predicted values (Eq. (1)), which can be used to control maximum allowable gain in an audio processing system, e.g. a hearing aid.

In the second example, using the Eq. (6), provides the desired convergence rate in the transient part of π(ω,n) of the OLTF by adjusting the step size μ. In this example, the desired value of convergence rate is set to −0.005 dB/iteration, the radian frequency is chosen to be ω=2πI/L, where I=7 denotes the frequency bin number. Again, the length of the adaptive filter L is taken to be equal to 32.

Figure 3:
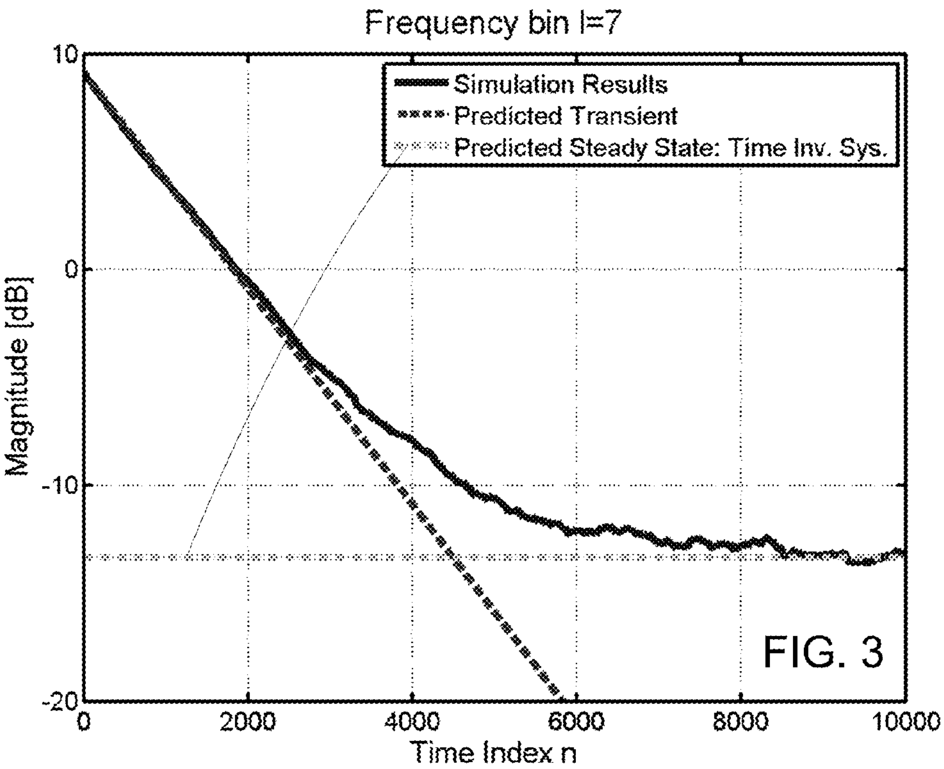
FIG. 3 shows an example of an adjustment of step size in order to get a slope of −0.005 dB/iteration in the magnitude of the OLTF.

The step size is calculated to be μ(n)=0.000591, and the simulations results are given in FIG. 3. The step size is adjusted in order to get a slope of −0.005 dB/iteration in the magnitude of OLTF. This is seen as the magnitude value in the transient part is reduced by 5 dB after the first 1000 iterations. The results are averaged using 100 simulation runs and support the choice of step size by using Eq. (6).

In the third example we show by simulations that using Eq. (10) we can obtain the desired steady state value $\hat{\pi}(\omega,\infty)$ by adjusting the step size μ(n).

In this example, the desired value of $\hat{\pi}(\omega,\infty)$ is set to be −6 dB, and the radian frequency is chosen to be $$\omega = \frac{2\pi l}{L},$$

where l=7 denotes the frequency bin number. Again, the length of the adaptive filter L is taken to be equal to 32, whereas step size μ is calculate according to Eq. (10).

Figure 4:
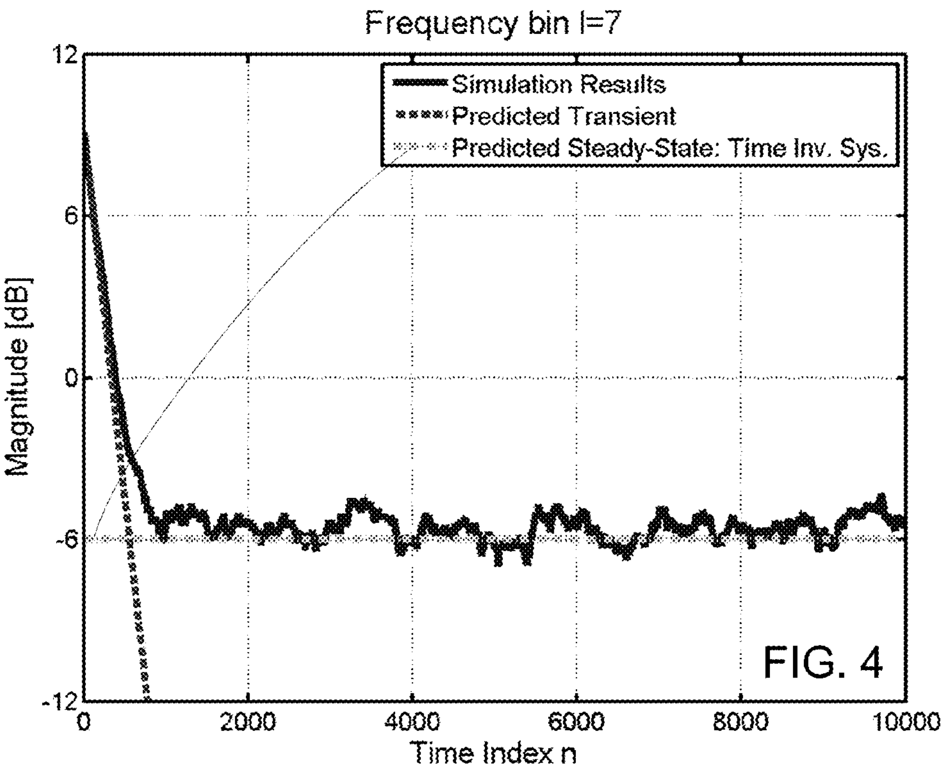
FIG. 4 shows an example of an adjustment of step size wherein a −6 dB steady state magnitude value of the OLTF is desired.

The step size is calculated to be $\mu(n)=0.0032$. This is verified by simulations and the results are given in FIG. 4. FIG. 4 shows an example of an adjustment of step size wherein a −6 dB steady state magnitude value of the OLTF is desired. The results are averaged using 100 simulation runs and support the choice of step size by using Eq. (10).

The derived expressions can be used to predict, in real-time, the transient and steady state value of the magnitude value of the feedback part of OLTF, which is an essential criterion for the stability. Furthermore, the derived expressions can be used to control the adaptation algorithms in order to achieve the desired properties.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims. The examples given above are based on the expressions for the LMS algorithm. Similar and other examples may be derived using expressions for the OLTF based on other adaptive algorithms, e.g. the NLMS- or the RLS-algorithms. Further, the examples are focused on determining step size in an adaptive feedback cancellation algorithm. However, other parameters than step size and other algorithms than one for cancelling feedback may be determined/benefit by/from using the concepts of the present disclosure. An example is parameters of an adaptive directional algorithm, e.g. beamformer filters, e.g. the frequency response $G_i(\omega)$ of beamformer filters $g_i$, cf. e.g. equation (s) (1) above.

References

[Haykin] S. Haykin, Adaptive filter theory (Fourth Edition), Prentice Hall, 2001.

[Proakis] John G. Proakis, Dimitis & Manolakis, Digital Signal Processing: Principles, Algorithms and Applications (Third Edition), Prentice Hall, 1996.

[Dillon] H. Dillon, Hearing Aids, Thieme Medical Pub., 2001.

[Gay & Benesty], Steven L. Gay, Jacob Benesty (Editors), Acoustic Signal Processing for Telecommunication, 1. Edition, Springer-Verlag, 2000.

[Gunnarsson & Ljung] S. Gunnarson, L. Ljung. Frequency Domain Tracking Characteristics of Adaptive Algorithms, IEEE Transactions on Acoustics, Speech, and Signal Processing, Vol. 37, No. 7, July 1989, pp. 1072-1089.

U.S. Pat. No. 5,680,467 (GN DANAVOX) 21 Oct. 1997

US 2007/172080 A1 (PHILIPS) 26 Jul. 2007

WO 2007/125132 A2 (PHONAK) 8 Nov. 2007

U.S. Pat. No. 5,473,701 (ATT) 5 Dec. 1995

WO 99/09786 A1 (PHONAK) 25 Feb. 1999

EP 2 088 802 A1 (OTICON) 12 Aug. 2009

The invention claimed is:

1. A method of determining a system parameter sp(n) of an adaptive algorithm in an adaptive feedback cancellation algorithm in an audio processing system, the audio processing system comprising a) a microphone system comprising a1) a number P of electric microphone paths, each microphone path MPi, i=1, 2, . . . , P, providing a processed microphone signal, each microphone path comprising a1 .1) a microphone $M_i$ for converting an input sound to an input microphone signal $y_i$;

a1.2) a summation unit $SUM_i$, for receiving a feedback compensation signal $\hat{v}_i$; and the input microphone signal or a signal derived therefrom and providing a compensated signal $e_i$; and a1.3) a beamformer filter $g_i$ for making frequency-dependent directional filtering of the compensated signal $e_i$, the output of said beamformer filter $g_i$ providing a processed microphone signal $\bar{e}_i$, i=1, 2, . . . , P;

a2) a summation unit SUM(MP) connected to the output of the microphone paths i=1, 2, . . . , P, to perform a sum of said processed microphone signals $\bar{e}_i$, i=1, 2, . . . , P; thereby providing a resulting input signal;

b) a signal processing unit for processing said resulting input signal or a signal originating therefrom to a processed signal;

c) a loudspeaker unit for converting said processed signal or a signal originating therefrom to an output sound, said processed signal or said signal originating therefrom being termed the loudspeaker signal u;

said microphone system, signal processing unit and said loudspeaker unit forming part of a forward signal path; and d) an adaptive feedback cancellation system comprising a number of internal feedback paths $IFBP_i$, i=1, 2, . . . , P, for generating an estimate of a number P of unintended feedback paths, each unintended feedback path at least comprising an external feedback path from the output of the loudspeaker unit to the input of a microphone $M_i$, i=1, 2, . . . , P, and each internal feedback path comprising a feedback estimation unit for providing an estimated impulse response $h_{est,i}$ of the $i^{th}$ unintended feedback path, i=1, 2, . . . , P, using said adaptive feedback cancellation algorithm, the estimated impulse response $h_{est,i}$ constituting said feedback compensation signal $\hat{v}_i$ being subtracted from said microphone signal $y_i$ or a signal derived therefrom in respective summation units $SUM_i$ of said microphone system to provide error signals $e_i$, i=1, 2, . . . , P;

the forward signal path, together with the external and internal feedback paths defining a gain loop;

the method comprising:

S1) determining an expression of an approximation of the square of the magnitude of the feedback part of the open loop transfer function, $\pi_{est}(\omega,n)$, where $\omega$is normalized angular frequency, and n is a discrete time index, where the feedback part of the open loop transfer function comprises the internal and external feedback paths, and the forward signal path, exclusive of the signal processing unit, and wherein the approximation defines a first order difference equation in $\pi_{est}(\omega,n)$, from which a transient part depending on previous values in time of $\pi_{est}(\omega,n)$ and a steady state part can be extracted, the transient part as well as the steady state part being dependent on the system parameter sp(n) at the current time instance n;

S2a) determining the slope per time unit $\alpha$ for the transient part,

S3a) expressing the system parameter sp(n) by the slope $\alpha$;

S4a) detatinining the system parameter sp(n) for a predefined slope-value $\alpha_{pd}$; or S2b) determining the steady state value $\pi_{est}(\omega,\infty)$ of the steady state part, S3b) expressing the system parameter sp(n) by the steady state value $\pi_{est}(\omega,\infty)$;

S4b) determining the system parameter sp(n) for a predefined steady state value $\pi_{est}(\omega,\infty)_{pd}$.

2. A method according to claim 1 wherein said adaptive feedback cancellation algorithm is an LMS, NMLS, or an RLS algorithm or is based on Kalman filtering.

3. A method according to claim 1 wherein said summation unit $SUM_i$ of the $i^{th}$ microphone path is located between the microphone $M_i$ and the beamformer filter $g_i$.

4. A method according to claim 1 where the system parameter sp(n) comprises a step size μ(n) of an adaptive feedback cancellation algorithm, or one or more filter coefficients $g_i$ of an adaptive beamformer filter algorithm.

5. A method according to claim 4 where the adaptive feedback cancellation algorithm is an LMS algorithm, and wherein said approximation of the square of the magnitude of the feedback part $\pi_{est}(\omega,n)$ of the open loop transfer function is expressed as $$\hat{\pi}(\omega, n) \approx (1 - 2\mu(n)S_n(\omega))\hat{\pi}(\omega, n-1) + L\mu^2(n)S_u(\omega)\sum_{i=1}^{P}\sum_{j=1}^{P} G_i(\omega)G_j^*(\omega)S_{x_{ij}}(\omega) + \sum_{i=1}^{P}|G_i|^2 S_{\check{h}_{ii}}(\omega),$$

where * denotes complex conjugate, n and ω are the time index and normalized frequency, respectively, μ(n) denotes the step size, and where $S_u(\omega)$ denotes the power spectral density of the loudspeaker signal u(n), $S,_{xij}(\omega)$ denotes the cross power spectral densities for incoming signal $x_i(n)$ and $x_j(n)$, where i=1, 2, . . . , P are the indices of the microphone channels, where P is the number of microphones, L is the length of the estimated impulse response $h_{est,i}(n)$, and $G_i(\omega)$ where 1=i,j is the squared magnitude response of the beamformer filters $g_i$, and where $S_{hii}(\omega)$ is an estimate of the variance of the true feedback path h(n) over time.

6. A method according to claim 5 wherein the slope α of said transient part is expressed as $$\alpha = 1 - 2\mu(n)S_u(\omega).$$

7. A method according to claim 5 wherein, when a specific convergence rate is desired, the step size of the LMS algorithm is chosen according to $$\mu(n) \approx \frac{1 - 10^{Slope_{dB/iteration}/10}}{2S_u(\omega)},$$

or $$\mu(n) \approx \frac{1 - 10^{Slope_{dB/s}/(10f_s)}}{2S_u(\omega)}.$$

8. A method according to claim 5 wherein said steady state value $\hat{\pi}(\omega,\infty)=\lim_{n\to\infty}\hat{\pi}(\omega,n)$ is expressed as $$\hat{\pi}(\omega, \infty) \approx \lim_{n\to\infty} L\frac{\mu(n)}{2}\sum_{i=1}^{P}\sum_{j=1}^{P} G_i(\omega)G_j^*(\omega)S_{x_{ij}}(\omega) + \lim_{n\to\infty}\frac{\sum_{i=1}^{P}|G_i(\omega)|^2 S_{\check{h}_{ii}}(\omega)}{2\mu(n)S_u(\omega)}.$$

9. A method according to claim 8, wherein when a specific steady state value $\pi_{est}(\omega,\infty)$ is desired, the step size of the LMS algorithm is chosen according to $$\mu(n) \approx \frac{\hat{\pi}(\omega, \infty) \pm \sqrt{\hat{\pi}^2(\omega, \infty) - L\sum_{i=1}^{P}\sum_{j=1}^{P} G_i(\omega)G_j^*(\omega)S_{x_{ij}}(\omega)\sum_{i=1}^{P}|G_i(\omega)|^2 S_{\check{h}_{ii}}(\omega) \Big/ S_u(\omega)}}{\left(L\sum_{i=1}^{P}\sum_{j=1}^{P} G_i(\omega)G_j^*(\omega)S_{x_{ij}}(\omega)\right)}.$$

10. A method according to claim 4 wherein the adaptive feedback cancellation algorithm is an NLMS algorithm, and wherein said of approximation of the square of the magnitude of the feedback part $\pi_{est}(\omega,n)$ of the open loop transfer function is expressed as $$\hat{\pi}(\omega, n) = \left(1 - 2\frac{\mu(n)}{L\sigma_u^2}S_u(\omega)\right)\hat{\pi}(\omega, n-1) + L\left(\frac{\mu(n)}{L\sigma_u^2}\right)^2 S_u(\omega)\sum_{i=1}^{P}\sum_{j=1}^{P} G_i(\omega)G_j^*(\omega)S_{x_{ij}}(\omega) + \sum_{i=1}^{P}|G_i(\omega)|^2 S_{\check{h}_{ii}}(\omega),$$

where * denotes complex conjugate, n and ω are the time index and normalized frequency, respectively, μ(n) denotes the step size, and where $S_u(\omega)$ denotes the power spectral density of the loudspeaker signal u(n), $S_{xij}(\omega)$ denotes the cross power spectral densities for incoming signal $x_i(n)$ and $x_j(n)$, where i=1, 2, . . . , P are the indices of the microphone channels, where P is the number of microphones, L is the length of the estimated impulse response $h_{est,i}(n)$, and $G_i(\omega)$ where 1=i,j is the squared magnitude response of the beamformer filters $g_i$, and where $S_{hii}(\omega)$ is an estimate of the variance of the true feedback path h(n) over time, and where $\sigma_u^2$ is the signal variance of loudspeaker signal u(n), where the slope α of said transient part is expressed as $$\alpha = 1 - 2\frac{\mu(n)}{L\sigma_u^2}S_u(\omega),$$

and the steady state value $\hat{\pi}(\omega,\infty)=\lim_{n\to\infty}\hat{\pi}(\omega,n)$ is expressed as $$\hat{\pi}(\omega, \infty) = \lim_{n\to\infty}\frac{\mu(n)}{2\sigma_u^2}\sum_{i=1}^{P}\sum_{j=1}^{P} G_i(\omega)G_j^*(\omega)S_{x_{ij}}(\omega) + \lim_{n\to\infty} L\sigma_u^2\frac{\sum_{i=1}^{P}|G_i(\omega)|^2 S_{\check{h}_{ii}}(\omega)}{2\mu(n)S_u(\omega)},$$

11. A method according to claim 4 wherein the adaptive feedback cancellation algorithm is an RLS algorithm, and wherein said of approximation of the square of the magnitude of the feedback part $\pi_{est}(\omega,n)$ of the open loop transfer function is expressed as $$\hat{\pi}(\omega, n) = (1 - 2p(\omega, n)S_u(\omega))\hat{\pi}(\omega, n-1) + Lp^2(\omega, n)S_u(\omega)\sum_{i=1}^{P}\sum_{j=1}^{P} G_i(\omega)G_j^*(\omega)S_{x_{ij}}(\omega) + \sum_{i=1}^{P}|G_i(\omega)|^2 S_{\check{h}_{ii}}(\omega),$$

-continued where $$p(\omega, n) = \frac{1}{\lambda}(p(\omega, n-1) - p^2(\omega, n-1)S_u(\omega))$$

$\lambda(n)$ is the forgetting factor in RLS algorithm and $p(\omega,n)$ is calculated as the diagonal elements in the matrix $$\lim_{L\to\infty} FP(n)F^H,$$

where $F\in\square^{L\times L}$ denotes the DFT matrix, and P(n) is calculated as $$P(n) = \left(\sum_{i=1}^{n} \lambda^{n-i} u(i) u^T(i) + \delta\lambda^n I\right)^{-1},$$

where $\delta$ is a constant and I is the identity matrix, and where the slope $\alpha$ of said transient part is expressed as $\alpha=2\lambda-1$ and the steady state value $\hat{\pi}(\omega,\infty) = \lim_{n\to\infty}\hat{\pi}(\omega,n)$ is expressed as $$\hat{\pi}(\omega, \infty) = L\frac{1-\lambda}{2S_u(\omega)}\sum_{i=1}^{P}\sum_{j=1}^{P} G_i(\omega)G_j^*(\omega)S_{x_{ij}}(\omega) + \frac{\sum_{i=1}^{P}|G_i(\omega)|^2 S_{\underset{h_{ii}}{\vee}}(\omega)}{2(1-\lambda)}.$$

12. A method according to claim 5, wherein the power spectral density $S_u(\omega)$ of the loudspeaker signal u(n) is continuously calculated.

13. A method according to claim 5, wherein the cross power spectral densities $S_{xij}(\omega)$ for incoming signal $x_i(n)$ and $x_j(n)$ are continuously estimated from the respective error signals $e_i(n)$ and $e_j(n)$.

14. A method according to claim 5, wherein the variance $S_{hii}(\omega)$ of the true feedback path h(n) over time is estimated and stored in the audio processing system in an offline procedure prior to execution of the adaptive feedback cancellation algorithm.

15. A method according to claim 5, wherein the frequency response $G_i(\omega)$ of the beamformer filter $g_i$, i=1, . . . , P is continuously calculated, in case it is assumed that $g_i$changes substantially over time, or alternatively in an off-line procedure, prior to execution of the adaptive feedback cancellation algorithm.

16. A method according to claim 1 wherein the expression of an approximation of the square of the magnitude of the feedback part of the open loop transfer function $\pi_{est}(\omega,n)$ is determined in the following steps:

S1a) The estimation error vector $h_{diff,i}(n)=h_{est,i}(n) - h_i(n)$ is computed as the difference between the i'th estimated and true feedback path;

S1b) The estimation error correlation matrix $H_{ij}(n)=E[h_{diff,i}(n)\, h^T_{diff,j}(n)]$ is computed;

S1c) An approximation $H_{est,ij}(n)$ is made from $H_{ij}(n)$ by ignoring the higher order terms appeared in $H_{ij}(n)$ due to presence of their lower order terms;

S1d) The diagonal entries of $F\cdot H_{est,ij}(n)\cdot F^T$ are computed, where F denotes the discrete Fourier matrix;

S1e) $\hat{\pi}(\omega,n)$ is determined as a linear combination of the diagonal entries of $F\cdot H_{est,ij}(n)\cdot F^T$ and the frequency responses $G_i(\omega)$ and $G_j(\omega)$ of the beamformer filters $g_i$ and $g_j$.

17. An audio processing system, comprising:

a) a microphone system comprising a1) a number P of electric microphone paths, each microphone path MPi, i=1, 2, . . . , P, providing a processed microphone signal, each microphone path comprising a1 .1) a microphone $M_i$ for converting an input sound to an input microphone signal $y_i$;

a1.2) a summation unit $SUM_i$ for receiving a feedback compensation signal $\hat{v}_i$ and the input microphone signal or a signal derived therefrom and providing a compensated signal $e_i$; and a1.3) a beamformer filter $g_i$ for making frequency-dependent directional filtering of the compensated signal $e_i$, the output of said beamformer filter $g_i$ providing a modified microphone signal $\bar{e}_i$, i=1, 2, . . . , P;

a2) a summation unit SUM(MP) connected to the output of the microphone paths i=1, 2, . . . , P, to perforin a sum of said processed microphone signals $yp_i$, i=1, 2, . . . , P, thereby providing a resulting input signal;

b) a signal processing unit for processing said resulting input signal or a signal originating therefrom to a processed signal;

c) a loudspeaker unit for converting said processed signal or a signal originating therefrom to an output sound, said processed signal or said signal originating therefrom being termed the loudspeaker signal u;

said microphone system, signal processing unit and said loudspeaker unit forming part of a forward signal path; and d) an adaptive feedback cancellation system comprising a number of internal feedback paths $IFBP_i$, i=1, 2, . . . , P, for generating an estimate of a number P of unintended feedback paths, each unintended feedback path at least comprising an external feedback path from the output of the loudspeaker unit to the input of a microphone $M_i$, i=1, 2, . . . , P, and each internal feedback path comprising a feedback estimation unit for providing an estimated impulse response $h_{est,i}$ of the $i^{th}$ unintended feedback path, i=1, 2, . . . , P, using said adaptive feedback cancellation algorithm, the estimated impulse response $h_{est,i}$ constituting said feedback compensation signal $\hat{v}_i$ being subtracted from said microphone signal $y_i$or a signal derived therefrom in respective summation units $SUM_i$ of said microphone system to provide error signals $e_i$, i=1, 2, . . . , P;

the forward signal path, together with the external and internal feedback paths defining a gain loop;

wherein the signal processing unit is adapted to determine an expression of an approximation of the square of the magnitude of the feedback part of the open loop transfer function, $\pi_{est}(\omega,n)$, where $\omega$ is normalized angular frequency and n is a discrete time index, and wherein the approximation defines a first order difference equation in $\pi_{est}(\omega,n)$, from which a transient part depending on previous values in time of $\pi_{est}(\omega,n)$ and a steady state part can be extracted, the transient part as well as the steady state part being dependent on a system parameter sp(n) of an adaptive algorithm at the current time instance n; and wherein the signal processing unit based on said transient and steady state parts is adapted to determine the system parameter sp(n) of an adaptive algorithm from a predefined slope-value $a_{pd}$ or from a predefined steady state value $\pi_{est}(\omega,\infty)_{pd}$, respectively.

18. A tangible computer-readable medium storing a computer program comprising program code means for causing a data processing system to perform the steps of the method of claim 1, when said computer program is executed on the data processing system.

19. A data processing system comprising a processor and program code means for causing the processor to perform the steps of the method of claim 1.

* * * * *